US008861157B2

(12) United States Patent
Ehrhardt et al.

(10) Patent No.: US 8,861,157 B2
(45) Date of Patent: Oct. 14, 2014

(54) SURGE ARRESTOR COMPRISING AT LEAST ONE ARRESTER ELEMENT

(75) Inventors: Arnd Ehrhardt, Neumarkt/Opf. (DE); Stefanie Schreiter, Neumarkt/Opf. (DE); Christian Burger, Hemau (DE)

(73) Assignee: Dehn + Söhne GmbH + Co. KG, Neumarkt/Opf. (DE)

( * ) Notice: Subject to any disclaimer, the term of this patent is extended or adjusted under 35 U.S.C. 154(b) by 903 days.

(21) Appl. No.: 12/737,852

(22) PCT Filed: Aug. 25, 2009

(86) PCT No.: PCT/EP2009/060900
§ 371 (c)(1),
(2), (4) Date: May 16, 2011

(87) PCT Pub. No.: WO2010/023193
PCT Pub. Date: Mar. 4, 2010

(65) Prior Publication Data

US 2011/0211287 A1 Sep. 1, 2011

(30) Foreign Application Priority Data

Aug. 25, 2008 (DE) ........................ 10 2008 039 626
Jan. 15, 2009 (DE) ........................ 10 2009 004 703

(51) Int. Cl.
*H02H 3/22* (2006.01)
*H01C 7/12* (2006.01)
*H01T 1/14* (2006.01)

(52) U.S. Cl.
CPC *H01T 1/14* (2013.01); *H01C 7/126* (2013.01); *H01C 7/12* (2013.01)
USPC ............... 361/91.1; 361/55; 361/56; 361/118

(58) Field of Classification Search
CPC ........... H02H 3/22; H01C 7/12; H01C 7/126; H01T 1/14
USPC ........................................................ 361/91.1
See application file for complete search history.

(56) References Cited

U.S. PATENT DOCUMENTS

2004/0211459 A1* 10/2004 Suenaga et al. ............... 136/244

FOREIGN PATENT DOCUMENTS

DE 3734214 4/1989 ............... H01C 7/12
DE 102006052955 3/2008 ............... H02H 5/04

(Continued)

OTHER PUBLICATIONS

English version of the International Search Report dated Nov. 5, 2009 and English translation of the International Preliminary Report on Patentability (Chapter I of the Patent Cooperation Treaty) dated Mar. 1, 2011.

*Primary Examiner* — Rexford Barnie
*Assistant Examiner* — Toan Vu
(74) *Attorney, Agent, or Firm* — Gerald T. Bodner

(57) ABSTRACT

A surge arrestor includes at least one arrestor element, and a disconnecting device for disconnecting the arrestor element from the grid. The disconnecting device includes a thermal disconnect point that is incorporated into the electrical connection path within the arrestor. A moving conductor section or a moving conductive bridge is connected to the arrestor element by way of the disconnect point. A conducting element is disposed in or at the end of the path of motion of the conductor section or of the bridge, the conducting element coming into contact with the conductor section or the bridge when the disconnecting device is triggered. A moving insulation part penetrates into the path of motion of the conductor section or of the bridge directly prior to or upon reaching a short circuit state.

7 Claims, 7 Drawing Sheets

(56) References Cited

FOREIGN PATENT DOCUMENTS

Figure 1:
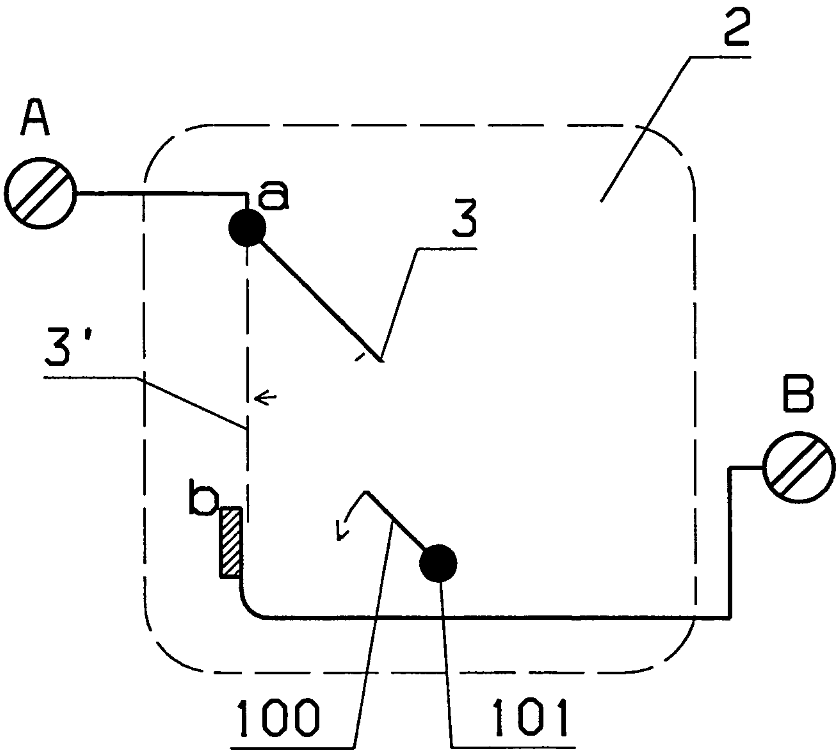

| | | | |
|---|---|---|---|
| EP | 0860927 | 8/1998 | ............... H02H 9/04 |
| FR | 2877156 | 4/2006 | ............... H02H 9/06 |
| GB | 765050 | 1/1957 | |
| WO | WO2005/112050 | 11/2005 | ............... H01H 7/12 |
| WO | WO2006/040418 | 4/2006 | ............... H01H 9/32 |

* cited by examiner

SURGE ARRESTOR COMPRISING AT LEAST ONE ARRESTER ELEMENT

The invention relates to a surge arrester comprising at least one arrester element, for example a varistor, as well as a disconnection device for disconnecting the arrester element (s) from the mains, wherein the disconnection device comprises a thermal point of separation which is incorporated into the electrical connection path within the arrester, wherein a movable conductor section or a movable conductive bridge is connected by means of the point of separation to the arrester element on the one hand, and the conductor section or the bridge is connected to a first external electrical connection of the arrester on the other hand, and comprising a means for generating a preload force, such as a spring, wherein the force vector associated therewith acts directly or indirectly on the conductor section or the bridge in the disconnecting direction by means of a movable disconnecting component, wherein further a conductive element is disposed in or at the end of the path of the movement of the conductor section or the bridge, which comes into contact with the conductor section or the bridge when the disconnection device is released, and which is connected to a second external electrical connection for forming a short-circuiting device, according to the preamble of patent claim 1.

Disconnection devices which also include a short-circuit function are known, wherein, in the disconnected or released switching state of the disconnection device, the current path via the defective arrester element is short-circuited in such a way that the current commutes from the arrester element to a connected bypass.

The so connected low-impedance short-circuit path can be used, for example, to actuate an upstream switching element, which is adjusted to the short-circuit current of the affected power supply system, or to generate a defined sustained short circuit which, in certain applications, is defined as a so-called fail-safe condition.

With respect to this prior art, reference is made, for example, to EP 0 860 927 A1. This printed document describes a very complicated electromechanical device, which monitors the current by means of a varistor and, once a predetermined limit value is exceeded, connects the short circuit in the bypass to the varistor path by means of electromechanical contacts.

According to DE 37 34 214 C2, a thermally releasable disconnection device is prior art. The switching element thereof constitutes a changeover contact. The changeover contact closes the varistor circuit in a manner known per se via a soldering point. If the switching element is released, another contact is closed, which can be interconnected either as an internal or external fault indicator or via a corresponding external connection as short circuit. Especially in photovoltaic systems the operating current is approximately equal to the short-circuit current due to the characteristic of the power-feeding source. In such direct voltage applications, a classical disconnection upon the heating of a varistor and its disconnection device does not lead to the desired result, because the system voltage of photovoltaic systems amounts up to 1000 V and the breaking of 1000 V DC circuits can be realized only with a considerable construction and instrumentation expenditure.

A further developed surge arrester is known from DE 10 2006 052 955 A1, comprising a housing and at least one arrester element, for example a varistor, as well as a disconnection device. It is possible to realize the arrester also in a retrofittable manner, such that it is capable of safely carrying a short-circuit current.

To this end, disconnection devices known per se for surge arresters are provided with an additional connection, which adds a short-circuit function to the existing disconnecting function. Specifically, it is proposed to configure the additional connection heterogeneously so as to allow, in case of need, also an external activation on a correspondingly realized surge arrester.

To this end, at least one conductive element is arranged in the path of the movement of a spring-preloaded conductor or the spring-preloaded bridge, the first end of which comes into contact with the conductor section or the bridge if the disconnection device is activated.

The second end of the conductive element is connected to a second external electrical connection. Moreover, means are provided for protecting the contact point between the conductor section or bridge and the conductive element against splashed out solder residues or solder material or the aforementioned melting materials, respectively.

Although it is basically possible that the short-circuit current be carried safely according to this prior teaching, a spark or arc is generated between the elements of the point of separation when the disconnection device responds and is opened. This arc is quenched only when the corresponding switching tongue reaches the short-circuit contact. The path between a fixed varistor contact and the switching tongue and the short-circuit contact, respectively, only has a very small electric strength due to the thermal effect of the arc directly after the arc has been quenched, which electric strength is increased very slowly in terms of time. If the short-circuit current in the short-circuit path is to be cut very fast by a corresponding switching device, e.g. a fuse, this switching device quickly builds up a high voltage which imparts a load on the electrical parallel path between the varistor contact and the switching tongue and short-circuit contact, respectively.

If, as a result of the preceding arc load, this path is not yet sufficiently voltage-proof it ignites again owing to the voltage load and another arc is generated in the arrester. In this case the disconnection device has failed. Based on the foregoing it it therefore the object of the invention to provide a further developed surge arrester comprising at least one arrester element and including a short-circuit function, wherein the electric strength of the isolating distance is increased prior to switching off a switching device in the short-circuit path so as to effectively prevent a failure or overload of the arrester element.

The solution to the object of the invention is achieved with a surge arrester comprising at least one arrester element, specifically a varistor, and a disconnection device according to the combination of features defined in patent claim 1. The dependent claims define at least useful embodiments and advancements.

Accordingly, there is provided a surge comprising at least one arrester element, for example, a varistor, and a disconnection device, the disconnection device serving to disconnect the at least one arrester element from the mains.

The disconnection device comprises a thermal point of separation known per se, which is incorporated into the electrical connection path within the arrester. A movable conductor section or a movable conductive bridge is connected by means of the point of separation to the arrester element on the one hand, and the conductor section or the bridge is connected to a first external electrical connection of the arrester on the other hand. In addition, means for generating a preload force are provided, such as at least one spring, wherein the force vector of the spring acts directly or indirectly on the conductor section or the bridge in the disconnecting direction by means of a movable disconnecting component.

Further, a conductive element is disposed in or at the end of the path of the movement of the conductor section or the bridge, which comes into contact with the conductor section or the bridge when the disconnection device is released, and which is connected to a second external electrical connection for forming a short-circuiting device. In addition, means for breaking the short circuit may be provided in the short-circuit branch, e.g. a fuse.

According to the invention, a movable insulating part is provided which penetrates into the path of movement of the conductor section or the bridge immediately prior to or upon reaching the short-circuit state in order to counteract and prevent or suppress a re-ignition of the arc between the conductive element and the point of separation.

The solution according to the invention permits a significant increase of the strength of the isolating distance after the arc has been quenched, namely before the upstream contact-breaking device, e.g. in the form of a fuse, generates a voltage, which would otherwise cause a re-ignition of the isolating distance.

According to a first embodiment the movable insulating part may be realized in the form of a plate the longitudinal expansion of which extends into the path of movement in a rest position.

During the actual disconnection process the plate is carried along from its rest position by the movable bridge. Upon reaching the short-circuit position of the movable bridge the plate returns into its rest position so that the isolating distance is correspondingly extended. In this case, the isolating distance is reliably blocked by the insulating part.

The aforementioned plate according to the first embodiment of the invention may be mounted in a fixed manner on one end and have resiliently flexible properties.

Alternatively, the plate may be rigid, but mounted to be rotationally movable on one end. The mounting is here preferably accomplished such that the plate is held in its rest position with the aid of a spring force. The movement of the plate out of the rest position is accomplished by the kinetic energy of the movable bridge during the disconnection process, to which this energy is supplied by a corresponding spring preload.

According to a second embodiment the movable disconnecting component acts on the bridge in the event of a disconnection, wherein the insulation part is integrated in the disconnecting component or the disconnecting component comprises such a part.

The disconnecting component with the insulating part may have a shape similar to a boomerang including two legs, wherein the means generating the preload force acts on a first leg, the second leg forms the insulating part, and a rotational axis is located between both legs.

According to a third embodiment of the invention the movable disconnecting component interacts with a rotary slide as insulating part, wherein the rotary slide is carried along by the disconnecting component during the disconnection process and penetrates into the path of movement when the short-circuit state is reached.

The rotary slide is mounted on a rotational axis that differs from the pivot point of the disconnecting component.

According to a fourth embodiment of the invention the movable insulating part is displaceably mounted, for example in tube form, at or on the bridge, wherein the insulating part is carried along by the disconnecting component so as to immerse or penetrate into the path of movement at the latest in the short-circuit state.

The surge arrester described above is particularly characterized by the use thereof in direct voltage systems with high system voltages and operating currents on a short-circuit current level, specifically for photovoltaic installations.

The invention shall be explained in more detail below by means of an embodiment and with the aid of figures.

Figure 2A:
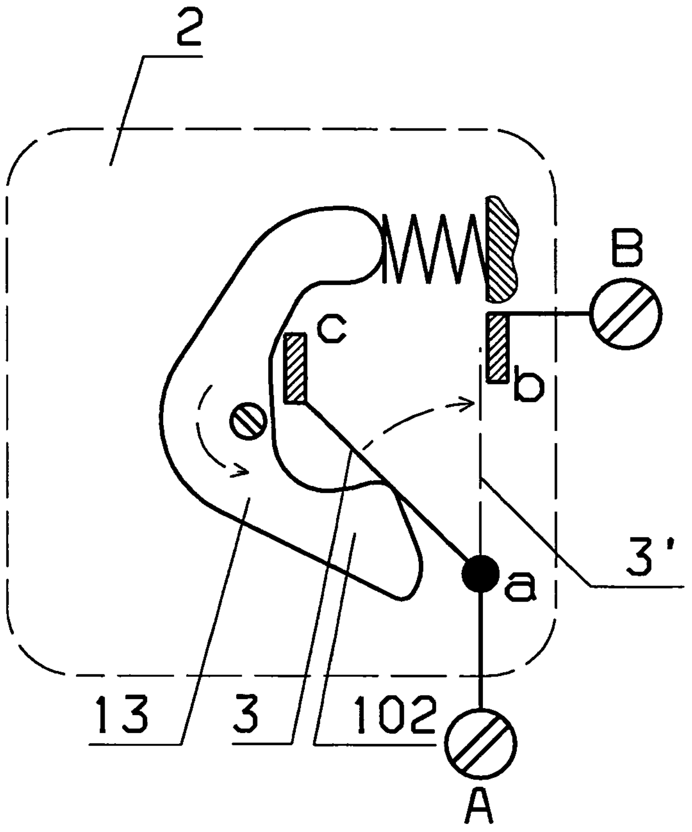
Figure 2B:
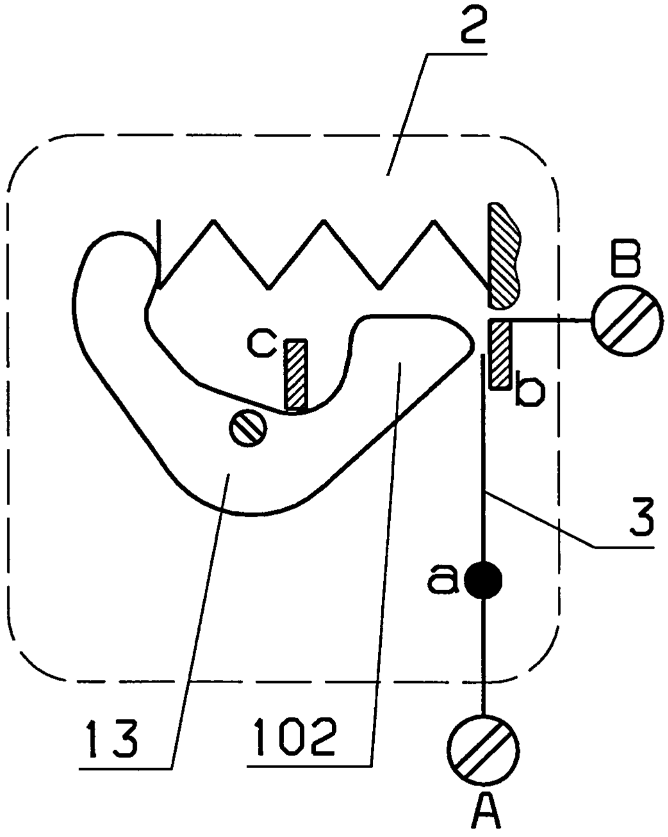
Figure 3A:
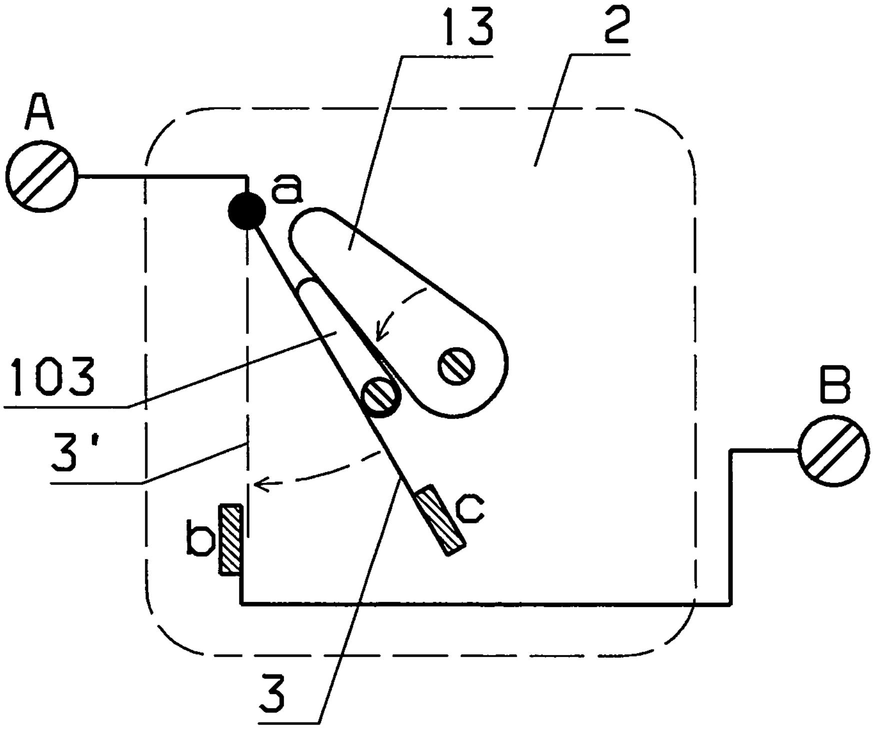
Figure 3B:
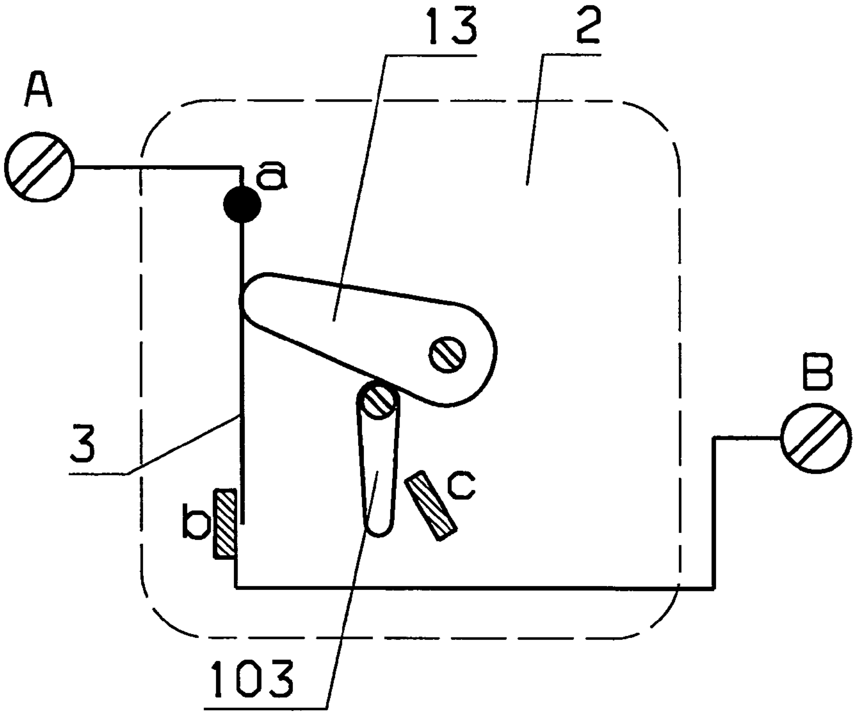
Figure 4A:
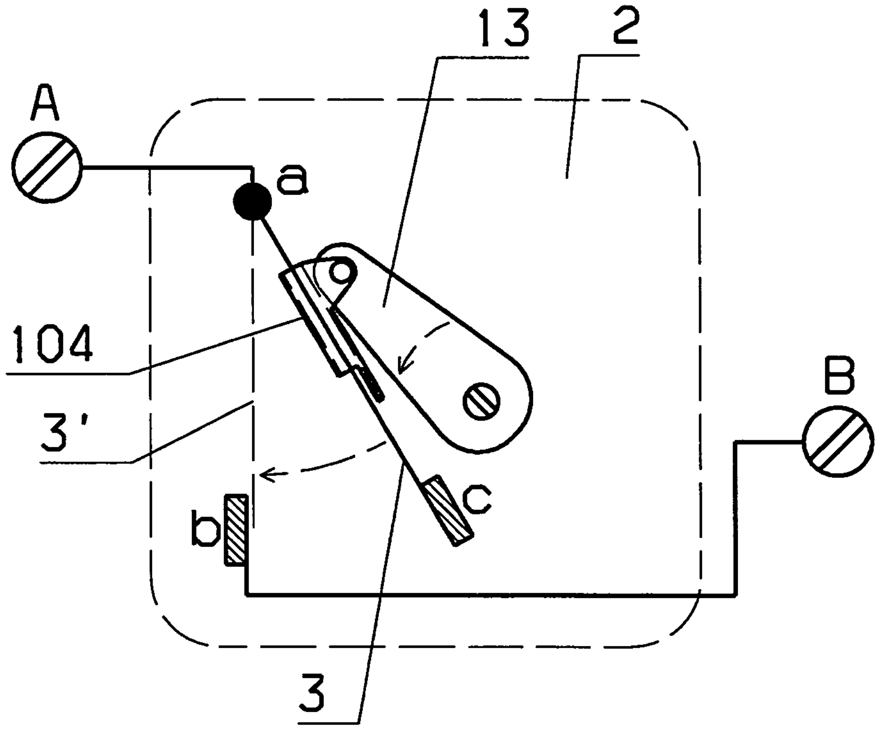
Figure 4B:
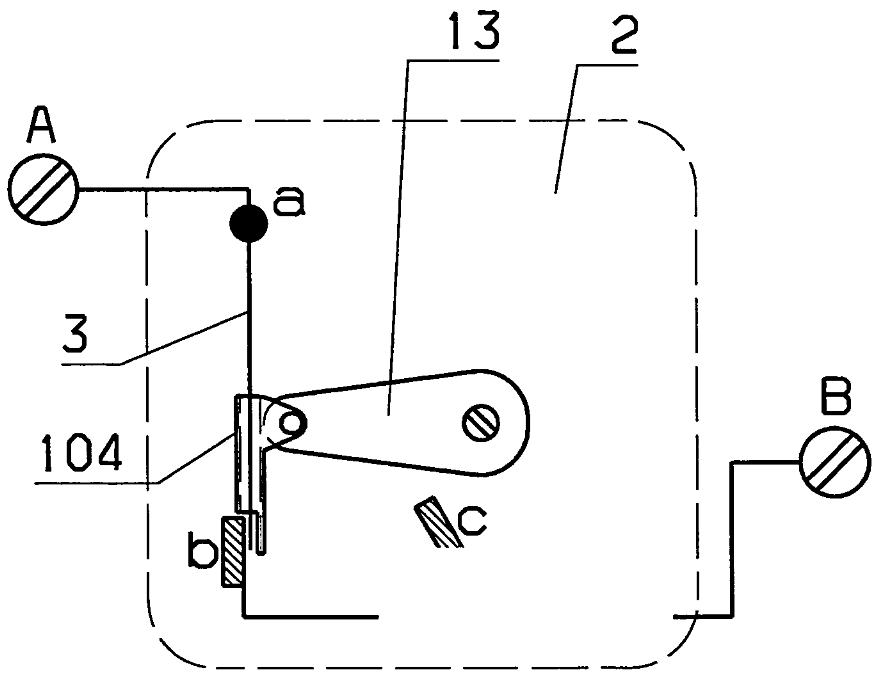

In the drawings:

FIG. 1 shows a schematic representation of the first embodiment comprising an insulating plate;

FIG. 2*a* shows a representation of a second embodiment of the invention comprising a specifically shaped disconnecting component comprising an integrated insulating part, in the state prior to the disconnection process;

FIG. 2*b* shows a representation similar to the one of FIG. 2*a*, but in the state after the disconnection and realization of the short circuit;

FIG. 3*a* shows another embodiment of the invention comprising a rotary slide carried along at least partially by a rotationally movable disconnecting component, in the state prior to the disconnection;

FIG. 3*b* shows a representation similar to the one of FIG. 3*a*, but in the state of disconnection and achieved short circuit;

FIG. 4*a* shows a fourth embodiment of the invention comprising an insulating part realized in form of a slide, in the state prior to the disconnection; and FIG. 4*b* shows a representation similar to the one of FIG. 4*a*, but in the disconnected and short-circuited state.

For the purpose of increasing the electric strength of the isolating distance the embodiments have in common that an insulating part or a slide is introduced prior to switching off an external switching device in the short-circuit path.

This slide made of an insulating material is slid between the point of separation c or fixed varistor connection pin, respectively, and the short-circuit contact b so that the path between the contacts c and b is extended and a re-ignition is more difficult.

Preferably, this insulating part or the slide is slid in only when the movable switching tongue 3 has reached the short-circuit contact b. This ensures that the slide is not damaged by the arc, permitting the arc a possible alternative route for the re-ignition due to the burn-off of or laterally bypassing the slide. To this end, a time-coordinated introduction of the insulating part or slide relative to the movement of the switching tongue 3 is essential.

The above-described situation differs from slides that are introduced between the contacts in order to quench a present arc immediately when the disconnection device is opened. In such solutions the slide directly increases the switching capacity of arresters without a short-circuit path. Such a measure is by all means appropriate in the event of small overloads and when used in AC mains. If the overloads are high, or also when used in the DC range, the direct arc quenching by means of the slide is problematical.

In the present invention it is important, if possible, that the slide does not contact the arc between parts 3 and c, or only to a small extent, in order to prevent these parts from being damaged and avoid an unnecessary extension and increase of the energy input prior to the short circuit.

After the short circuit has been produced between parts 3 and b, the slide or insulating part is to block the isolating distance as reliably as possible and clearly extend the path between parts 3 and c.

In terms of time this is to be reliably accomplished prior to switching off the short-circuit current in the short-circuit path, that is, before the path between parts 3 and c is acted on by the switching voltage of the switching element.

In the first embodiment according to FIG. 1 a varistor arrester 2 is used, which includes two connection points or connection paths A and B.

A movable conductor section or a movable conductive bridge 3 is pivotably movable about the contact point a. A fixed varistor connection c is connected to a corresponding end of tongue 3, for example by a low-melting solder, so as to obtain the desired thermal point of separation.

In the event of an overload this point of separation melts, and the tongue 3 or the movable conductive bridge 3, respectively, moves to position 3' (as is shown by the arrow). Then, when the free end of the tongue 3 reaches the conductive element b, which is connected to the connection path B, the desired short circuit is obtained.

According to FIG. 1, for example, an elastic insulating plate 100, which is fixable, for example, at position 101, is located in the movement path of the movable conductive bridge 3.

Alternatively, a rigid insulating plate 100 may be used, which is preloaded by a spring and fixed at position 101 in a rotationally movable and returnable manner.

When the bridge 3 moves, the plate 100 is displaced and slightly bent, respectively. Just before or when the switching tongue reaches the short-circuiting device, i.e. the conductive element b, the plate 100 moves back into its rest position or initial position at a high speed, that is, between parts b and c, so that there is no more direct path left between these two contacts for a possible arc.

In the embodiment according to FIGS. 2*a* and 2*b* a disconnecting component 13 is provided, which is pivotably movable about a fixed point (representation of the arrow inside part 13). This disconnecting component 13 has a boomerang-like shape. A first end of the disconnecting component 13 is preloaded by a spring 1.

The second end of the disconnecting component 13 forms the actual insulating part 102.

If, in the event of an overload, the thermal point of separation becomes undone, the bridge 3 moves (representation of the arrow) toward the conductive element b (position 3') so that the desired short circuit is obtained. At this moment the insulating part 102 penetrates into the path between c and b, with the consequence that the present isolating distance is blocked as desired.

The insulating part 102 of the disconnecting component 13 can be guided by grooves so that no continuous sliding surfaces remain between parts c and b. Alternatively or additionally, parts c and b and bridge 3, respectively, may also be elevated relative to the surface made of insulating material, which serves to cover the varistor 2 (not shown).

The reached position of the insulating part 102 in the short circuit and disconnection case is shown in the representation according to FIG. 2*b*.

In the embodiment according to FIGS. 3*a* and 3*b* the disconnecting component 13 is preloaded by a non-illustrated spring. The preload takes place in the direction of the arrow inside part 13.

A rotary slide 103 is located as insulating part between the disconnecting component 13 and the bridge 3.

This rotary slide is held on a rotational axis in a rotationally movable manner, the axis position of which differs from the rotational axis of the disconnecting component 13.

In the event of a thermal overload the bridge 3 moves from position c to position b, i.e. toward the conductive element b, with the consequence that the desired short-circuit state is obtained (position according to 3').

The short-circuit state and the then altered position of the rotary slide 103 are shown in FIG. 3*b*. Again, the rotary slide penetrates into the path between parts c and b and increases the separating distance.

If desired, the position relative to parts 13 and 103 may also be returnable.

The movement of the rotary slide 103 takes place in coordination with the movement of the disconnecting component 13 and the action thereof on bridge 3.

Also, the rotary slide may be shovel-shaped or U-shaped in order to allow a lateral separation of the contact area.

FIGS. 4*a* and 4*b* show an embodiment in which the insulating part is fixed as a slide 104 directly at or on the bridge 3.

The movable part 104 is positively connected to the disconnecting component 13, so that the rotational movement thereof (representation of the arrow inside part 13) is transferred and transformed into a longitudinally displaced movement.

When the short-circuit position of the bridge 3 is reached the insulating part 104 has moved downwardly in the figure, wherein a projecting end penetrates into the isolating distance between parts b and c and increases the separating distance.

The insulating part 104 may be realized as a tube or as a tube including a recess which, after the contact is separated, is completely or only partially pushed over the bridge 3 immediately or with a time delay.

The displacement and the design of part 104 can influence whether an arc-quenching function or penetration only after the realization of the short circuit is desired.

LIST OF REFERENCE NUMBERS

1 spring
2 varistor
3 movable bridge
3' short-circuit position of movable bridge
a fixed connection point of movable bridge 3
b conductive element
c thermal point of separation and fixed varistor connection
A; B connection path
13 disconnecting component
100, 102, 103, 104 movable insulating part
101 fixed point for movable insulating part 100 or pivot point of the same

The invention claimed is:

1. Surge arrester comprising at least one arrester element (2), and a disconnection device for disconnecting the arrester element(s) (2) from line power, wherein the disconnection device comprises a thermal point of separation (c) which is incorporated into the electrical connection path within the arrester, wherein a movable conductor section or a movable conductive bridge (3) is connected by means of the point of separation (c) to the arrester element (2) on the one hand, and the conductor section or the bridge (3) is connected to a first external electrical connection (A) of the arrester on the other hand, and comprising a means for generating a preload force, wherein a force vector associated therewith acts directly or indirectly on the conductor section or the bridge (3) in the disconnecting direction by means of a movable disconnecting component (13), wherein further a conductive element (b) is disposed in or at the end of the path of the movement of the conductor section or the bridge (3), which comes into contact with the conductor section or the bridge (3) when the disconnection device is released, and which is connected to a second external electrical connection (B) for forming a short-circuiting device;

wherein a movable insulating part (100; 102; 103; 104) is provided which penetrates into the path of movement of the conductor section or the bridge (3) immediately prior to or upon reaching the short-circuit state in order to prevent or suppress a re-ignition of the arc between the conductive element (b) and the point of separation (c);

wherein the movable disconnecting component (13) acts on the bridge (3) in the event of a disconnection, wherein the insulating part is integrated in the disconnecting component (13) or the disconnecting component (13) comprises the insulating part; and wherein the disconnecting component with the insulating part (102) has a shape similar to a boomerang including two legs, wherein the means generating the preload force acts on a first leg, the second leg forms the insulating part (102), and a rotational axis is located between both legs.

2. Surge arrester according to claim 1, characterized by the use thereof in direct voltage systems with high system voltages and operating currents on a short-circuit current level, specifically for photovoltaic installations.

3. Surge arrester comprising at least one arrester element (2), and a disconnection device for disconnecting the arrester element(s) (2) from line power, wherein the disconnection device comprises a thermal point of separation (c) which is incorporated into the electrical connection path within the arrester, wherein a movable conductor section or a movable conductive bridge (3) is connected by means of the point of separation (c) to the arrester element (2) on the one hand, and the conductor section or the bridge (3) is connected to a first external electrical connection (A) of the arrester on the other hand, and comprising a means for generating a preload force, wherein a force vector associated therewith acts directly or indirectly on the conductor section or the bridge (3) in the disconnecting direction by means of a movable disconnecting component (13), wherein further a conductive element (b) is disposed in or at the end of the path of the movement of the conductor section or the bridge (3), which comes into contact with the conductor section or the bridge (3) when the disconnection device is released, and which is connected to a second external electrical connection (B) for forming a short-circuiting device;

wherein a movable insulating part (100; 102; 103; 104) is provided which penetrates into the path of movement of the conductor section or the bridge (3) immediately prior to or upon reaching the short-circuit state in order to prevent or suppress a re-ignition of the arc between the conductive element (b) and the point of separation (c); and wherein the movable disconnecting component (13) interacts with a rotary slide (103) as the insulating part, wherein the rotary slide (103) is carried along by the disconnecting component (13) during the disconnection process and penetrates into the path of movement when the short-circuit state is reached.

4. Surge arrester according to claim 3, characterized in that the rotary slide (103) is mounted on a rotational axis that differs from the pivot point of the disconnecting component (13).

5. Surge arrester according to claim 3, characterized by the use thereof in direct voltage systems with high system voltages and operating currents on a short-circuit current level, specifically for photovoltaic installations.

6. Surge arrester comprising at least one arrester element (2), and a disconnection device for disconnecting the arrester element(s) (2) from line power, wherein the disconnection device comprises a thermal point of separation (c) which is incorporated into the electrical connection path within the arrester, wherein a movable conductor section or a movable conductive bridge (3) is connected by means of the point of separation (c) to the arrester element (2) on the one hand, and the conductor section or the bridge (3) is connected to a first external electrical connection (A) of the arrester on the other hand, and comprising a means for generating a preload force, wherein a force vector associated therewith acts directly or indirectly on the conductor section or the bridge (3) in the disconnecting direction by means of a movable disconnecting component (13), wherein further a conductive element (b) is disposed in or at the end of the path of the movement of the conductor section or the bridge (3), which comes into contact with the conductor section or the bridge (3) when the disconnection device is released, and which is connected to a second external electrical connection (B) for foaming a short-circuiting device;

wherein a movable insulating part (100; 102; 103; 104) is provided which penetrates into the path of movement of the conductor section or the bridge (3) immediately prior to or upon reaching the short-circuit state in order to prevent or suppress a re-ignition of the arc between the conductive element (b) and the point of separation (c); and wherein the movable insulating part (104) is displaceably mounted at or on the bridge (3), wherein the insulating part (104) is carried along by the disconnecting component (13) so as to penetrate into the path of movement at the latest in the short-circuit state.

7. Surge arrester according to claim 6, characterized by the use thereof in direct voltage systems with high system voltages and operating currents on a short-circuit current level, specifically for photovoltaic installations.

* * * * *